(12) United States Patent
Mittelbach et al.

(10) Patent No.: US 9,259,909 B2
(45) Date of Patent: Feb. 16, 2016

(54) FUNCTIONAL COMPOSITE MATERIAL

(75) Inventors: Walter Mittelbach, Freiburg (DE); Ralph Herrmann, Halle/Saale (DE); Jürgen Bauer, Lichtenfels (DE)

(73) Assignee: SorTech AG, Halle/Saale (DE)

( * ) Notice: Subject to any disclaimer, the term of this patent is extended or adjusted under 35 U.S.C. 154(b) by 668 days.

(21) Appl. No.: 12/734,752

(22) PCT Filed: Nov. 19, 2008

(86) PCT No.: PCT/EP2008/065825
§ 371 (c)(1),
(2), (4) Date: Sep. 15, 2010

(87) PCT Pub. No.: WO2009/065852
PCT Pub. Date: May 28, 2009

(65) Prior Publication Data
US 2011/0027506 A1 Feb. 3, 2011

(30) Foreign Application Priority Data
Nov. 23, 2007 (DE) .......................... 10 2007 056 587

(51) Int. Cl.
*B32B 15/04* (2006.01)
*B32B 3/10* (2006.01)
*B32B 38/10* (2006.01)
*B32B 37/24* (2006.01)
*C23C 18/12* (2006.01)
*B32B 15/01* (2006.01)

(52) U.S. Cl.
CPC ................. *B32B 38/10* (2013.01); *B32B 15/01* (2013.01); *B32B 37/24* (2013.01);
(Continued)

(58) Field of Classification Search
CPC .............. B32B 1/04; B32B 1/06; B32B 3/02; B32B 3/06; B32B 3/08; B32B 3/26; B32B 3/30; B32B 5/142; B32B 15/04; B32B 15/18; B32B 15/20; B01D 39/07
USPC ......... 428/156–159, 161, 163, 164, 165, 167, 428/173, 195.1–211.1; 210/321.6, 491.2; 55/464; 261/112.2; 96/154, 396
See application file for complete search history.

(56) References Cited

U.S. PATENT DOCUMENTS 4,248,915 A * 2/1981 Vinciguerra .................. 427/292
4,277,298 A 7/1981 L'Allemand ................. 156/199
(Continued)

FOREIGN PATENT DOCUMENTS

EP 0875360 11/1998 .............. B29C 59/16
JP 08-313707 11/1996 .............. G02B 5/02

OTHER PUBLICATIONS

PTFE Handbook by DuPont.*
(Continued)

*Primary Examiner* — Aaron Austin
*Assistant Examiner* — Megha Gaitonde
(74) *Attorney, Agent, or Firm* — Gerald T. Bodner

(57) ABSTRACT

The invention relates to a functional composite material consisting of a support (1) and a functional surface material (2). The composite material is characterized in that the support has a structured boundary layer (3) with a lower boundary (4), an upper boundary (5) a cross-linking depth (d) between the lower and upper boundaries and a substance boundary (6) that alternates between the upper and lower boundaries on the surface facing the functional surface material. The substance boundary (6) is designed in particular as a continuous sequence of surface molded sections (7) of the support with spaces (8) therebetween, each molded section having a height (h) that equals the cross-linking depth and at least one molded section and at least one space (8) lie within a horizontal width (b) corresponding to a multiple of the cross-linking depth.

15 Claims, 6 Drawing Sheets

Figure 1:
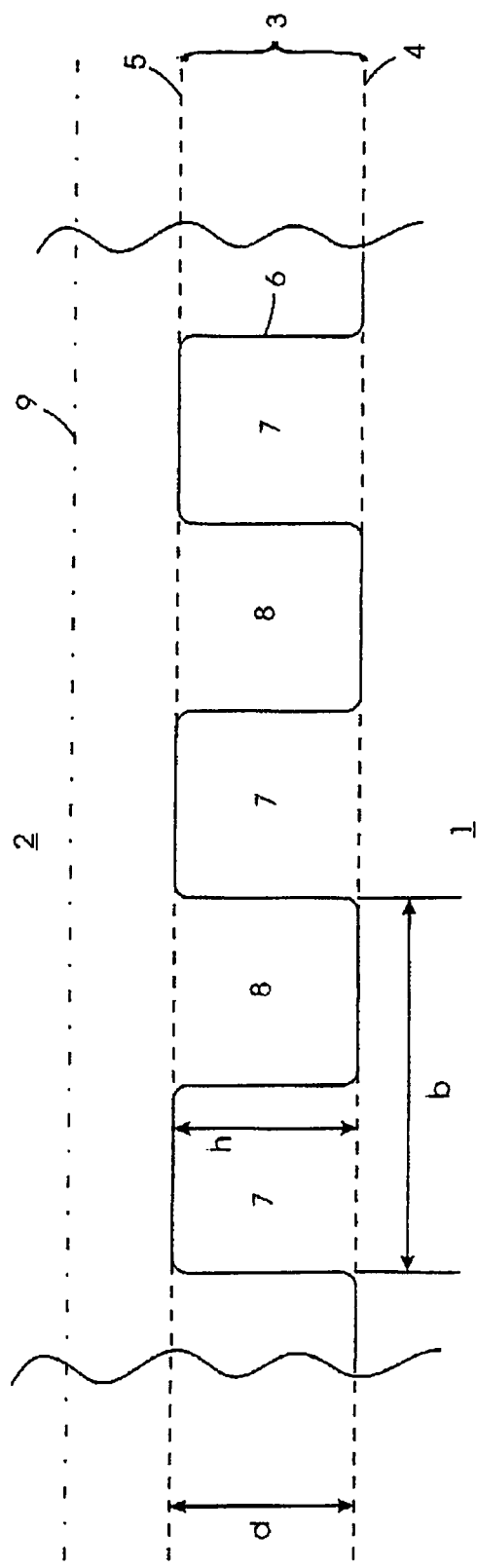

(52) U.S. Cl.
CPC ...... *C23C 18/1212* (2013.01); *B32B 2037/243* (2013.01); *B32B 2037/246* (2013.01); *B32B 2305/72* (2013.01); *B32B 2307/20* (2013.01); *B32B 2307/30* (2013.01); *B32B 2307/50* (2013.01); *B32B 2310/0843* (2013.01); *B32B 2315/02* (2013.01); *Y10T 428/13* (2015.01); *Y10T 428/24521* (2015.01)

(56) References Cited

U.S. PATENT DOCUMENTS

| | | | | |
|---|---|---|---|---|
| 4,402,714 | A | * | 9/1983 | Fethke et al. .................. 95/117 |
| 6,326,074 | B1 | * | 12/2001 | Takahashi .................... 428/156 |
| 2005/0068476 | A1 | | 3/2005 | Okabe ............................ 349/96 |
| 2005/0208275 | A1 | * | 9/2005 | Abe et al. ................... 428/195.1 |
| 2007/0076069 | A1 | * | 4/2007 | Edwards et al. .............. 347/100 |
| 2010/0263793 | A1 | * | 10/2010 | Ylitalo et al. ................ 156/344 |

OTHER PUBLICATIONS

International Search Report.

Notification of Transmittal of Translation the International Preliminary Report on Patentability, the International Preliminary Report on Patentability (in English) and the Written Opinion of the International Searching Authority (in English), dated Jul. 8, 2010.

* cited by examiner

FUNCTIONAL COMPOSITE MATERIAL

The invention relates to a functional composite material consisting of a carrier and a functional surface material, according to the preamble of claim 1.

Functional composite materials are used in a broad technical application range. Especially in sorption and catalysis processes involving a distinct heat of reaction such materials are of great significance. Moreover, they are employed in the field of corrosion and antifouling protection in order to make surfaces of chemical and technical apparatus insensitive to the influences of aggressive chemical substances and avoid residues.

Functional composite materials consist of a carrier material, e.g. metallic materials, ceramics or glass materials, and a functional material disposed on the surface thereof and serving as a catalyst, an adsorbent, a corrosion and antifouling protection, an insulator or as an electrical functional layer.

In the conventional production methods the functional materials are applied onto the corresponding carrier material in the form of molded bodies, especially pellets, or coatings. In most cases the surface of the carrier material is not totally covered or coated with the functional material, which results in an insufficient mechanical bonding of the functional materials on the carrier surface and in an insufficient thermal contact between the carrier material and the coating.

Coating methods resulting in a comparatively stable and direct surface-to-surface contact between the carrier material and the functional material, with the carrier surface being totally covered, are, for example, an in-situ crystallization, a surface crystallization and a consumptive surface crystallization. The mechanical properties of the composite material resulting therefrom and the achieved thermal coupling between the two components are, in fact, better, but by no means optimal for many usage conditions.

The different thermal expansion of the carrier material and the coating as a consequence of fast temperature changes usually results in solidity problems and the detachment of the functional coating. Such problems specifically occur in temperature control processes, calcinations and adsorbent activations. Also, with the increasing thickness of the coating of the functional material, the thermal transport in the composite is strongly limited.

Based on the above-described problems it is the object of the invention to provide a functional composite material which allows avoiding the aforementioned drawbacks and functional impairments in the long run. The composite material called for is to have a high thermal capacity, the mechanical bonding between the carrier material and the functional coating is to be able to withstand great stresses even if the layers are thicker, and the thermal transport in the composite is to have technically optimal values. The composite material called for is to allow a versatile use. Method steps for the production of such a composite material are to be provided.

The object is achieved with a functional composite material consisting of a carrier and a functional surface material according to the features of claim 1. With regard to the method aspect the object is achieved with a method for producing a composite material according to the features of claim 16. The respective dependent claims define useful and advantageous embodiments of the composite material and of the production method used therefor.

According to the invention the material boundary between the carrier and the functional surface material is not plane. The material boundary is rather structured within a boundary layer. This boundary layer has a thickness denoted as cross-linking depth. It is defined in the direction of the functional surface material by an upper boundary and in the direction of the carrier by a lower boundary. As a result thereof the carrier is interlocked on its respective surface with the functional surface material. This brings about a strongly enhanced bonding of the functional surface material to the surface of the carrier, along with an intensive thermal contact between the two components. Thus the thermal contact resistance between the carrier and the surface material is minimized.

Specifically, the material boundary is formed as a continuous sequence of profiles on the surface of the carrier with spaces there between, wherein each profile has a height that is equal to the cross-linking depth. In addition, at least one profile and at least one space are disposed within a horizontal width of the boundary layer corresponding to a multiple of the cross-linking depth.

This brings about an optimal matching between the height of the profiles and, thus, the thickness of the boundary layer or the cross-linking depth thereof, respectively, and the width of the profiles, which is necessary to obtain an optimum mechanical stability and a good thermal contact in the composite.

Advantageously, the profiles have a first profile width in the area of the lower boundary and second profile width different from the first profile width in the area of the upper boundary of the structured boundary layer. The so obtainable contour of the profiles can improve the thermal contact between the carrier and the coating and contributes to the enhanced stability of the composite structure.

In an advantageous embodiment the resulting material boundary extends on a horizontal width, which corresponds to at least double the cross-linking depth, repeatedly along the lower boundary and the upper boundary of the structured boundary layer. Such a relationship between the width and the height of the profiles has proved to be particularly favorable under the thermal, chemical and mechanical aspect.

Advantageously, the length of the alternating material boundary is dimensioned to amount to at least 1.1 times, preferably 1.3 to 2.5 times, a length of a plane material boundary of the carrier. The associated, correspondingly increased contact surface between the carrier and the functional surface material has proved to be thermally advantageous. The cross-linking depth has a value in the range of 5 to 100 µm, in particular of 5 to 60 µm.

The profiles may have different shapes. In a first modification the profiles form a series of webs having a rectangular, dovetailed and/or wavy contour. The rectangular and wavy contours are advantageous in respect of the thermal contact between the surface material and the carrier and in respect of an easier production, while the dovetailed contour brings about a very stable mechanical bonding in the composite structure.

The profiles may also be formed as a series of knobs having a bell-shaped, reversed or upright truncated pyramid shaped and/or mushroom head shaped contour. Contrary to the webs extending mainly in a longitudinal direction the knobs define a mountain/valley structure without a preferred direction.

The carrier may be made from different materials. It may be made of a metallic material, a ceramic material or a glass material. It may be provided in the form of a sheet or a plate, a tube or a sponge. The surface material, too, may be made of different materials. The surface material may be an adsorbent, a catalytically active material or a corrosion and/or antifouling protection, an insulator or an electrically functional material.

The above-described composite material can be produced in different ways. In a first embodiment the profiles are produced by using a method for applying, depositing or growing on a surface structure. This means that material is deposited on an initially substantially plane, i.e., in terms of the analysis described below, unstructured surface of the carrier.

To this end, in-situ crystallizations may be produced on the carrier. The profiles, too, can be crystallized onto the carrier.

A production of the profiles is also possible by means of a chemical or physical deposition of material from a gas phase. As an alternative to the aforementioned build-up surface treatments, a material-removing, specifically a material-dissolving method may be used for carving the profiles out of the surface of the carrier.

Figure 1A:
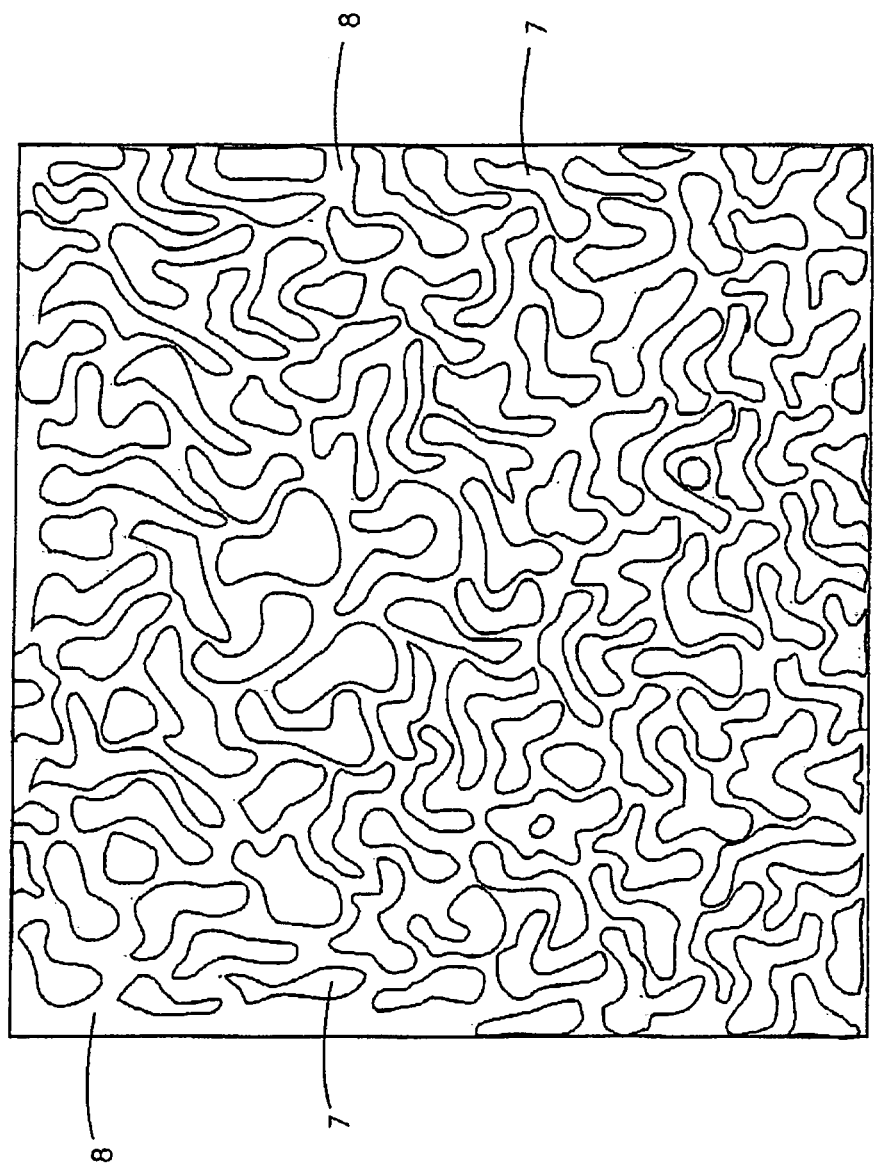
Figure 2:
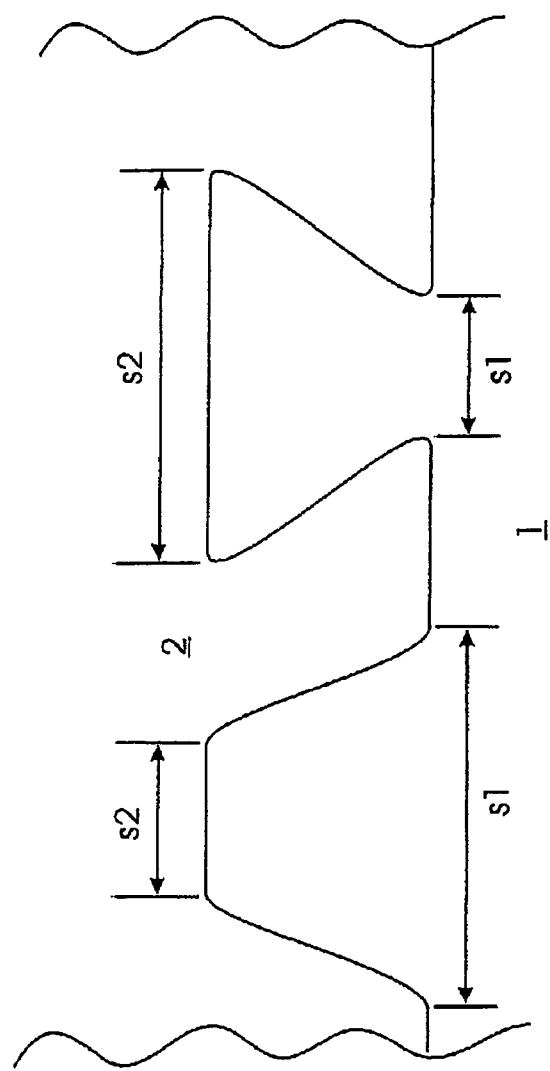
Figure 3:
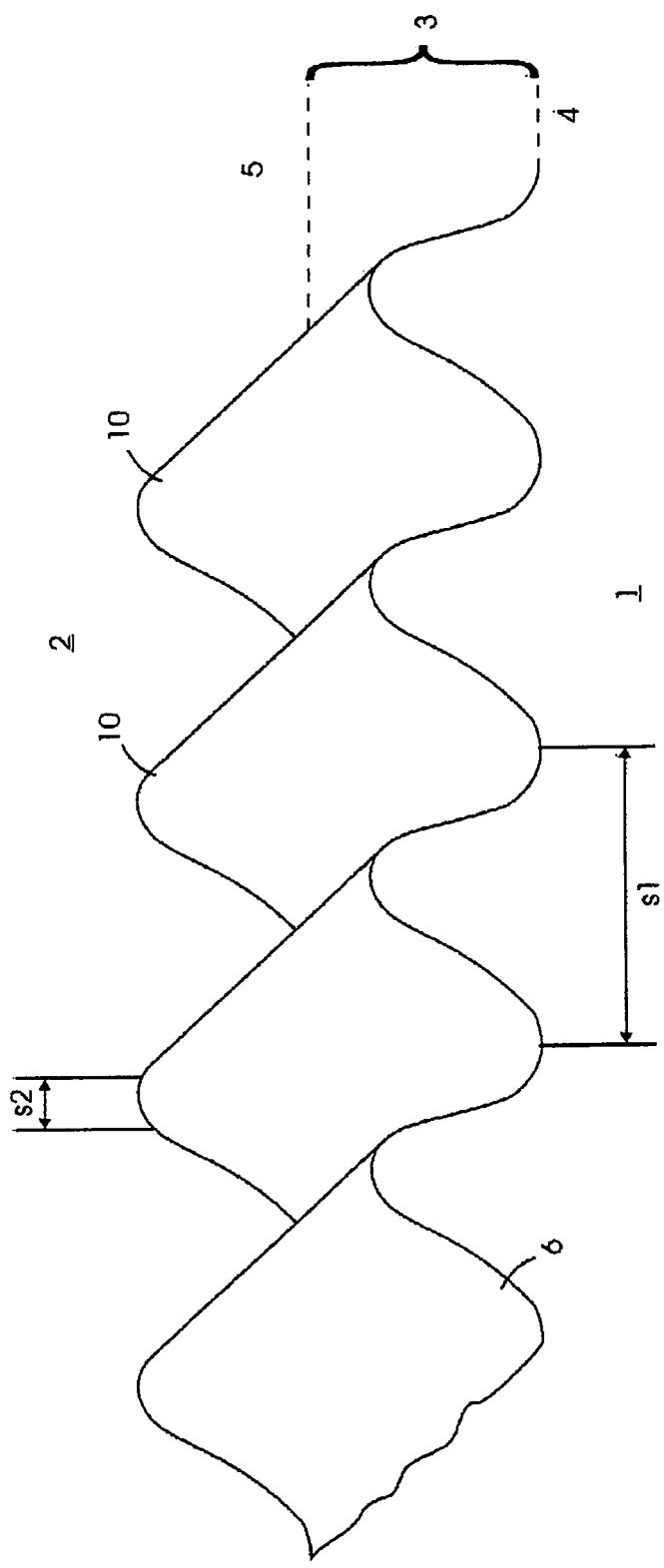
Figure 4:
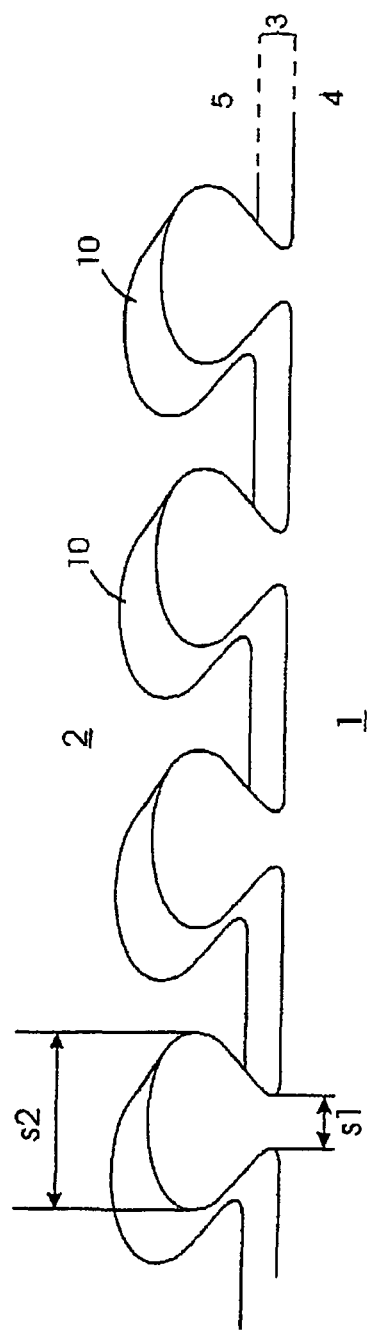
Figure 5:
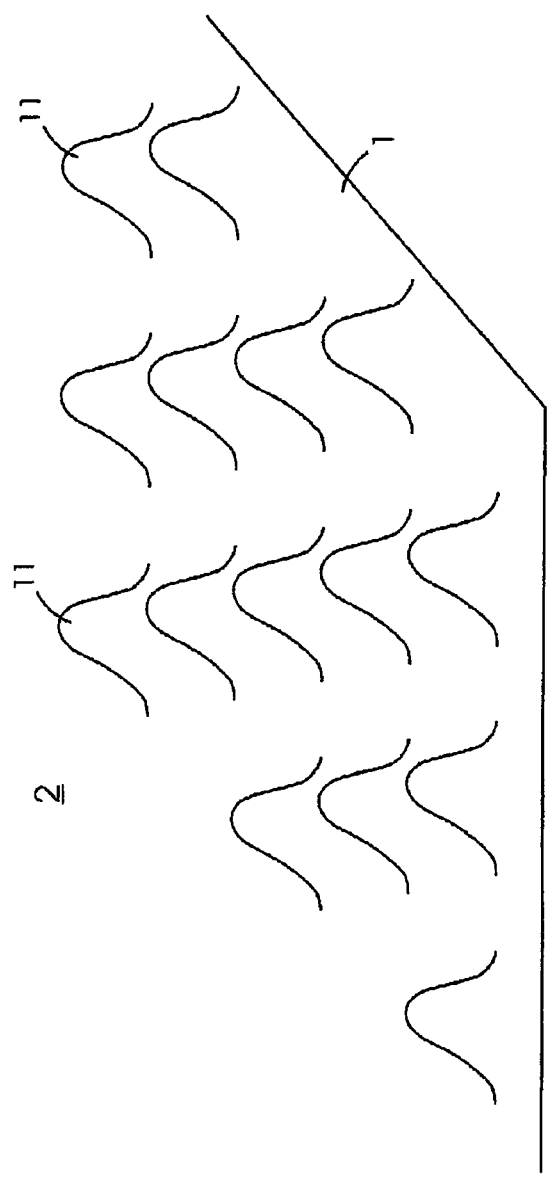

The composite material according to the invention shall be explained in more detail below by means of embodiments. Like components or identically acting components are designated with like reference numbers. The accompanying drawings serve illustration purposes. In the drawings:

FIG. 1 shows an exemplary first embodiment of a sequence of profiles having a rectangular contour, FIG. 1a shows an exemplary top view of a carrier surface, FIG. 2 shows modified trapezoidal and dovetailed embodiments of the profiles of FIG. 1, FIG. 3 shows profiles having a wavy contour, FIG. 4 shows profiles having a mushroom head contour, FIG. 5 shows profiles in the form of bell-shaped knobs.

FIG. 1 shows a carrier 1 having a functional surface material 2 deposited on it, which totally covers the carrier. The surface of the carrier facing the surface layer comprises a series of profiles 7 with spaces 8 positioned between the profiles. The totality of the profiles and spaces form a structured boundary layer 3 with a cross-linking depth d. The cross-linking depth defines the distance between a lower boundary 4 and an upper boundary 5 of the structured boundary layer. It corresponds to the distance between the highest and lowest level of the profiles.

The height h of each individual profile substantially corresponds to the cross-linking depth d of the structured boundary layer 3. The surfaces of the profiles and the spaces positioned there between define the resulting material boundary 6 between the carrier and the surface material 2, on which the surface material and the material of the carrier are in direct contact. As can be seen in FIG. 1, the material boundary 6 alternates between the upper and the lower boundaries 5 and 4 of the boundary layer 3. Its ruh is determined by the shape of the profiles 7 and the spaces 8 there between. As compared to a material boundary 9 of a plane carrier surface it has an increased length. A material assisting the bonding is not provided and not necessary.

The sequence of the profiles 7 and the spaces 8 there between is defined laterally relative to the size of a horizontal width b. Advantageously, the horizontal width is related to the cross-linking depth d of the structured boundary layer. It forms a lateral scale for the surface structure of the carrier. In the embodiment shown in FIG. 1 the horizontal width b amounts to approximately double the cross-linking depth d, with at least one profile 7 and one space 8 being within this scaling. The horizontal width b does not define a lattice constant in the narrower sense. The width of the profiles and the spaces there between may vary in the individual case. Of importance are rather the number of the profiles within the scaling predefined by the horizontal width b and the ratio of b to the cross-linking depth d respectively.

As is shown in the top view according to FIG. 1a the profiles may be formed entirely irregularly in the lateral direction, so that the dimensions defined in FIGS. 1 and 2 fluctuate by a mean value with respect to their width for characterizing the profiles. The cross-linking depth is substantially the same in the predominant part of the carrier surface.

As is illustrated in FIG. 2 and the following figures the profiles may have a contour different from the rectangular shape. In such a case a difference is made between a first profile width s1 in the area of the base of the profile at the lower boundary 4 and a second profile width s2 in the area of the upper boundary 5 of the structured boundary layer. With a trapezoidal profile having a broader base, as is shown on the left of FIG. 2, the first profile width s1 is greater than the second profile width s2. With a dovetailed profile illustrated on the right of FIG. 2 the second profile width s2 is greater than the first profile width s1. The values of the profile widths, and also their ratio of dimensions may vary within certain limits in the sequence of the profiles on a carrier surface. The profiles do not necessarily form a regular lattice.

FIG. 3 shows profiles 7 and spaces 8 in a wave shape. The material boundary 6 alternates continuously between the lower boundary 4 and the upper boundary 5 of the structured boundary layer 3. The first profile width s1 corresponds to the horizontal distances between the lowest points in the spaces 8, while the second profile width near the upper boundary 5 is, in this embodiment, ideally indefinitely small. In practice, however, the peaks of the wavy run of the material boundary comprise a certain flattening in the area of the surface layer. Thus, the second profile width s2 has a small, but finite value.

FIG. 4 shows profiles 7 having a mushroom head shape. A broader shape in the lower boundary area 4 changes to a tapered center portion in the area between the boundaries 4 and 5 and broadens again in the upper boundary area 5. The mushroom head structure can be considered as a rounded embodiment of the dovetailed structure according to FIG. 2.

In the embodiments shown in FIGS. 3 and 4 the profiles 7 extend in a web-like manner over a partial area of the surface of the carrier, so that the cross sections thereof are extruded over the surface of the carrier.

FIG. 5 shows a knob structure disposed on the carrier surface, which is formed of a not necessarily regular array of bell-shaped knobs 11 and valleys there between, which is covered by the surface coating 2. The knobs may also be trapezoidal or dovetailed.

The structured boundary surfaces, the runs of the material boundaries and the above-explained parameters thereof can be detected and tested in a very simple manner by means of microscopic methods. Advantageously, these methods are combined with a digital image processing. Provided that the structure is sufficiently isotropic, the two-dimensional contact surface between the carrier and the surface coating can be concluded from the material boundary which, in the section, is recognizable as a one-dimensional line.

To this end, preferably embedded cross sections of the composite samples to be tested are prepared, of which digital micrographs are made. The enlargement is preferably chosen to have at least 6, preferably 10 profiles comprised by the image area to be analyzed. The viewing scale is adjusted appropriately in order to obtain a useful ratio between image pixel and cross-linking depth. By using a standard image processing software, especially a vector-based drawing program, the above-described parameters, i.e. the cross-linking depth, the width of the profiles and the length of the resulting material boundary, can be detected easily.

The analysis of the generated surface structure and the cross-linking depth is based on the section of the functional composite material, whereof a segment having a length of approximately 1 mm is transferred in a hundredfold enlargement to an image format, for example, of 1024×768 pixels. If the resulting surface structure is anisotropic it is recommended to prepare the sections at different angles, followed by a corresponding analysis of the so generated images.

Cross-linking depths in the range between 15 and 60 μm have proved to be expedient. However, cross-linking depths as of 5 μm and up to 100 μm can be readily realized and likewise show good properties in the use of the composite. In the cross section the length of the resulting material boundary 6 can be detected and compared with the length of the material boundary of an unstructured surface of the carrier.

Tests have shown that the choice of the profiles, especially the width and the height thereof as well as the cross-linking depth resulting therefrom, is particularly convenient if the resulting material boundary is increased by a factor of at least 1.4 as compared to the material boundary of a plane, unstructured carrier surface.

The illustrated embodiments of the composite material show a clearly improved mechanical stability also under thermal influence. Specifically if functional surface layers have brittle material properties the risk of chipping of the coatings under thermal and mechanical stresses is clearly reduced. The material boundary enlarged due to the profiles increases the thermal transport between the carrier and the functional surface layer and thus allows thicker coatings, while the efficiency in applications that are subject to a strong heat of reaction is the same. This is particularly the case in catalysis and adsorption processes.

To produce a surface of the carrier according to one of the aforementioned embodiments particularly a consumptive surface crystallization is employed if zeolites are used. This involves a controlled carrier dissolution with a controlled zeolite growth, resulting in a mountain/valley structure with dovetailed knobs according to the embodiment shown in FIG. 5.

Similar surface structures can be realized by physical and chemical deposition processes, e.g. thermal evaporation, electron beam evaporation, laser beam evaporation or arc evaporation. Also, molecular beam epitaxial methods, sputtering or ion plating with or without the use of masks can be applied.

A zeolite layer having the aforementioned properties can be produced in a wet chemical process, for example, by adding a carrier material of aluminum or an aluminum alloy to a reaction solution composed of one part of phosphoric acid (H3PO4), 0.38 parts of silicon dioxide (SiO2) in the form of silica sol, 3 parts of morpholine and 70 parts of water in a quantity in which the ratio of the surface of the carrier material measured in square centimeters to the volume of the solution indicated in milliliters amounts to approximately 2 to 5. The so prepared mixture is heated to a temperature of 175° C. in a pressure vessel for 96 hours and is subsequently washed out in water. The treatment results in a SAPO-34-Zeolite layer on the surface of the carrier.

The composite material according to the invention was explained by means of embodiments. The examples shown may be modified by the person skilled in the art in correspondence with the fundamental idea of the invention. Other embodiments are defined in the dependent claims.

LIST OF REFERENCE NUMBERS 1 carrier
2 functional surface material
3 boundary layer
4 lower boundary
5 upper boundary
6 material boundary
7 profile
8 space
9 material boundary of a plane carrier surface
10 web
11 knob

The invention claimed is:

1. Functional composite material consisting of a metallic carrier (1) and a functional surface material (2), characterized in that
the carrier comprises a structured boundary layer (3) with a lower boundary (4) and an upper boundary (5), a cross-linking depth (d) between the lower and the upper boundary and a material boundary (6), the carrier (1) having a single boundary-forming material, the functional surface material (2) being deposited directly on the entire surface of the carrier and defining an exposed major outer surface of the composite material, wherein only the single boundary-forming material of the carrier (1) alternates between the lower and the upper boundary on the surface facing the functional surface material, wherein only the single boundary-forming material of the carrier (1) defines the material boundary (6), whereby the structured boundary layer comprises zeolite and the cross-linking depth (d) has a value of 5 μm to 100 μm, and wherein a length of the alternating material boundary (6) amounts to 1.3 to 2.5 times a length of a plane material boundary (9) of the carrier (1).

2. Functional composite material according to claim 1, characterized in that
the material boundary (6) is formed as a continuous sequence of profiles (7) on the surface of the carrier with spaces (8) there between, wherein each profile has a height (h) that is equal to the cross-linking depth and at least one profile and at least one space (8) are disposed within a horizontal width (b) of the boundary layer corresponding to a multiple of the cross-linking depth.

3. Functional composite material according to claim 1, characterized in that
the profiles (7) have a first profile width (s1) in the area of the lower boundary (4) and a second profile width (s2) different from the first profile width in the area of the upper boundary (5) of the structured boundary layer (3).

4. Functional composite material according to claim 1, characterized in that
the resulting material boundary (6) extends on a horizontal width (b), repeatedly along the lower boundary (4) and the upper boundary (5) of the structured boundary layer (3), whereby the horizontal width (b) is at least 2d.

5. Functional composite material according to claim 1, characterized in that
the profiles are formed as a web (10) having a rectangular, trapezoidal, dovetailed and/or wavy contour in cross section.

6. Functional composite material according to claim 1, characterized in that
the profiles are formed as an array of knobs (11) having a bell-shaped, reversed or upright truncated pyramid shaped and/or mushroom head shaped contour.

7. Functional composite material according to claim 1, characterized in that
the carrier is a tube, a sponge or a sheet or has the shape of a plate.

8. Functional composite material according to claim 1, characterized in that
the surface material (2) is an absorbent.

9. Functional composite material according to claim 1, characterized in that
the surface material (2) is a catalytically active material, an insulator or an electrically active material.

10. Functional composite material according to claim 1, characterized in that
the surface material (2) is a corrosion and/or antifouling protection.

11. Functional composite material according to claim 1, wherein the cross-linking depth (d) has a value of 5 μm to 60 μm.

12. Method for producing a functional composite material according to claim 1,
characterized in that
the profiles are produced by using a method for applying, depositing and/or growing on a surface structure.

13. Method according to claim 12,
characterized in that
the profiles are produced by an in-situ crystallization on the carrier.

14. Method according to claim 12,
characterized in that
the profiles are crystallized onto the carrier.

15. Method according to claim 12,
characterized in that
the profiles are produced by means of a chemical or physical deposition from a gas phase.

\* \* \* \* \*